Nov. 30, 1926.

H. T. MOODY

TIRE RIM TOOL

Filed June 17, 1925

1,609,032

INVENTOR:
Henry T. Moody

By
ATTORNEYS:

Patented Nov. 30, 1926.

1,609,032

UNITED STATES PATENT OFFICE.

HENRY T. MOODY, OF NEWBURYPORT, MASSACHUSETTS, ASSIGNOR TO VICTOR MANUFACTURING COMPANY, OF NEWBURYPORT, MASSACHUSETTS, A CORPORATION OF MASSACHUSETTS.

TIRE-RIM TOOL.

Application filed June 17, 1925. Serial No. 37,848.

My invention relates to a tool for removing and replacing tire rims. Such rims are usually made of a single piece of spring metal bent and formed at its ends so that the ends will fit together and form a spring lining for the tire. These rims are usually very difficult to remove and also replace because of the strength of the spring. Tools have been devised for removing them, but these tools being made substantially the diameter of the rim take up considerable room when not in use. Moreover, they are not easily adjusted to rims of different diameters.

My tool on the contrary may be used with rims of any diameter being telescopic in character. It comprises two members or square rods each end of which is provided with a rim engaging means, these rods being strapped together so that they may be slid with relation to each other to make the tool of proper length with relation to the diameter of the rim after which they are clamped together. Then, by suitable means, said engaging ends of the tool which have been attached to the rim are drawn together so that the diameter of the rim is contracted after which it may easily be removed from the tire. In practice the ends of the rim are pried out of engagement in the usual manner by a screw driver or other tool.

In replacing the rim in the tire the engaging means of the tool is brought into engagement with the interior of the rim and the tool is lengthened so that it expands the rim and forces its ends into place.

My invention will be understood by reference to the drawings in which it is shown in its preferred form.

Figure 3:
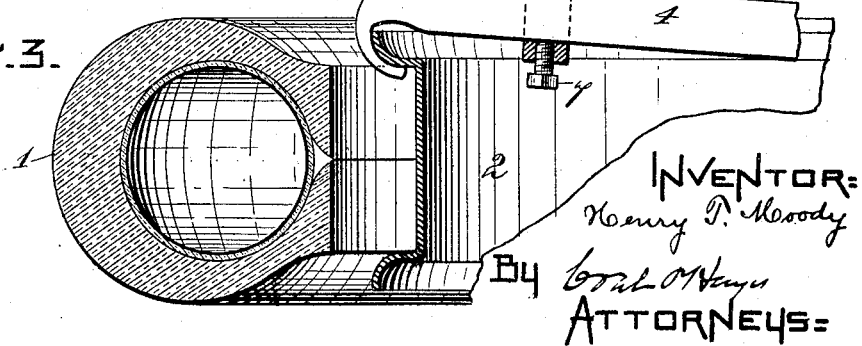
Fig. 3 is an enlarged detail sectional view.

1 is the tire and 2 is the rim, the ends of which are marked 21 and 22 and normally lie in contact. My tool comprises two rods 3 and 4 which are preferably square and two straps 5 and 6. Each rod 3 and 4 has an engaging means or hook 31, 41 at its end. The straps 5 and 6 are shaped as shown in Fig. 3, each having a passage appropriately shaped for the parts of the rods which are to slide through them. The strap 6 has a set screw 7 passing through it so that the length of the tool may be adjusted when the clamp screw 7 is tightened thus maintaining the tool at proper length. The strap 5 is attached to the other end of the rod 4. This strap acts as a guide for the sliding of the rod 3. The further end of the rod 3 is threaded as at 8 and carries two nuts 9 and 10 one on each side of the strap 6, so that the distance apart of the hooks 31 and 41 may be shortened after an approximate adjustment is made by the strap 6 and set screw 7.

Figure 1:
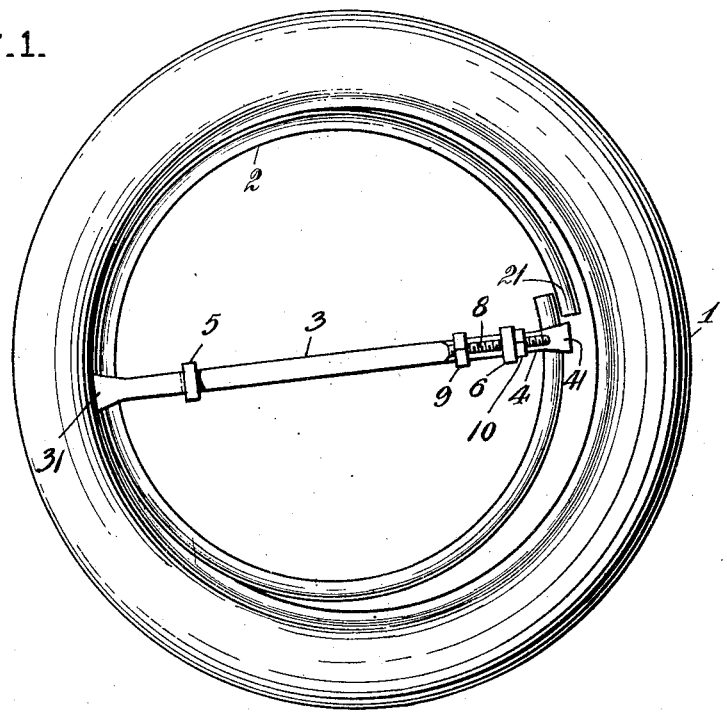
Figure 1 is an elevation of the rim in process of removal from a tire by my tool and showing the way in which my tool does its work.
Figure 2:
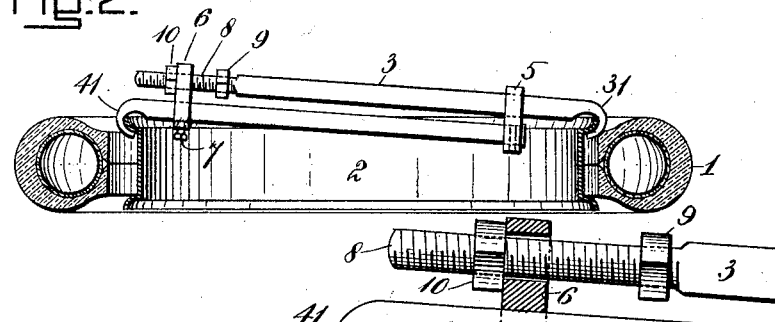
Fig. 2 is a section on line 2—2 of Fig. 1.

In practice, the screw 7 being loose, the hooks 31 and 41 are hooked over opposite ends of the rim and the screw 7 is then turned up tight so that the strap 6 is in fixed position on the rod 4. The nut 9 being moved away from the strap 6, the nut 10 is tightened so as to draw the hook 31 toward the hook 41. This can be done by an ordinary wrench, and pulls the rim away from the tire as shown in Fig. 1. The tire may then be easily removed from the rim.

To replace the rim in the tire the rods are adjusted so that the hooks will fit and engage the inside of the rim. Then by loosening the nut 10 and screwing up the nut 9, the tool will be lengthened and the rim will be pushed back into place.

The simplicity of this tool will be easily understood and as its action is either a pushing or pulling strain, the rods 3 and 4 need not be of heavy construction and, owing to the possibility of collapsing the tool, it may be made of short length compared with the length of the ordinary tool, say 18 inches by 2½ inches by 1 inch, because it is of a telescopic character and because of the strain that is applied to it.

I do not mean to limit myself to the precise construction shown as it may be varied in detail and yet embody my invention.

What I claim as my invention is:—

1. The tool above described comprising parallel members and means for slidably connecting them, each member having at one end thereof a tire-rim-engaging member, one of said slidable connections being longitudinally adjustably fixed to one of said parallel members, and means co-operating with said fixable when fixed connection whereby the length of said tool may be adjusted.

2. The tool above described comprising parallel sliding rods each having a rim engaging means at one end of it whereby to engage the opposite edges of a rim, straps to slidably connect said rods, one of said straps being slidably mounted on one rod and having means whereby it may be fixedly attached to the other rod, and means to co-operate with said last-named strap to adjust said engaging means with relation to each other.

3. The tire rim tool above described comprising two parallel rods, one of said rods having a rim-engaging member at one end and being threaded at the other end, and having two nuts located on said threaded portion, the other rod having a rim-engaging member at one end and a strap fastened to its other end, said strap enclosing said first-named rod, said second rod also having a second strap longitudinally adjustably attached thereto and enclosing said first-named rod between said nuts, whereby by the movement of said nuts in engagement with said second strap the distance apart of said rim-engaging members may be adjusted.

HENRY T. MOODY.